US006499349B1

(12) United States Patent
Aronsson

(10) Patent No.: US 6,499,349 B1
(45) Date of Patent: Dec. 31, 2002

(54) CONDITION ANALYZER

(75) Inventor: Carsten Aronsson, Strangnas (SE)

(73) Assignee: SPM Instrument AB, Strangnas (SE)

( * ) Notice: Subject to any disclaimer, the term of this patent is extended or adjusted under 35 U.S.C. 154(b) by 0 days.

(21) Appl. No.: 09/214,291

(22) PCT Filed: Jul. 4, 1997

(86) PCT No.: PCT/SE97/01221

§ 371 (c)(1),
(2), (4) Date: Jan. 4, 1999

(87) PCT Pub. No.: WO98/01831

PCT Pub. Date: Jan. 15, 1998

(30) Foreign Application Priority Data

Jul. 5, 1996 (SE) .............................................. 9602694

(51) Int. Cl.[7] .............................................. G01H 11/08
(52) U.S. Cl. .............................. 73/659; 73/660; 73/593; 702/56; 702/77
(58) Field of Search .................... 73/660, 661, 659, 73/593; 702/56, 77; 340/683

(56) References Cited

U.S. PATENT DOCUMENTS

| 4,520,674 A | 6/1985 | Canada et al. ................. 73/660 |
| 4,800,512 A | 1/1989 | Busch .......................... 73/660 |
| 5,319,962 A | 6/1994 | Kaminski et al. .............. 73/116 |
| 5,992,237 A | * 11/1999 | McCarty et al. ............... 73/659 |
| 6,006,164 A | * 12/1999 | McCarty et al. ............... 702/56 |
| 6,078,874 A | * 6/2000 | Piety et al. .................. 702/122 |
| 6,202,491 B1 | * 3/2001 | McCarty et al. ............... 73/659 |

FOREIGN PATENT DOCUMENTS

| DE | 39 15 126 | 11/1990 |
| DE | 44 27 880 | 2/1996 |
| EP | 0 194 333 | 9/1986 |
| WO | WO 95/00930 | 1/1995 |
| WO | WO 99/05486 | 2/1999 |

* cited by examiner

Primary Examiner—Daniel S. Larkin
Assistant Examiner—Rose M. Miller
(74) Attorney, Agent, or Firm—Young & Thompson

(57) ABSTRACT

The invention relates to a method for evaluating the condition of a machine (100) with a measuring point (90), which method is performed by a movable analysis apparatus (30). The method comprises the steps of producing a condition value, by means of measuring at the measuring point, which condition value is dependent on the actual condition of the machine, and storing the condition value in a writable information carrier (120) which is place by, or in the vicinity of, the measuring point (90) so that the condition value subsequently can be used as a reference condition value. The invention further relates to an apparatus for performing the method and a device for co-operating with the analysis apparatus and for mounting by a measuring point on machine (100).

31 Claims, 2 Drawing Sheets

CONDITION ANALYZER

TECHNICAL FIELD

The present invention relates to a method for generating a condition value for a measuring point on a machine having a measuring point, and a system for performing the method.

STATE OF THE ART

Machines with moving parts are subject to wear with the passage of time, which often causes the condition of the machine to deteriorate. Examples of such machines with movable parts are motors, pumps, generators, compressors, lathes and CNC-machines. It is known to, more or less regularly, investigate the operating condition of such machines. The operating condition can be determined by measuring the amplitude of vibrations in the bearings and by measuring temperature changes on the casing of the machine, which temperatures are dependent on the operating condition of the bearing. Such condition checks of machines with rotating or other moving parts are of great significance for safety and also for the length of the life of such machines. It is known to perform such measurements on machines completely manually. This ordinarily is done by an operator with the help of a measuring instrument performing measurements at a number of measuring points on a machine. The measuring data obtained by means of the measuring instrument for each measuring point is noted down on a pre-printed formula. For a machine it can be necessary to have a number of measuring points in order to later be able to determine the overall operating condition of the machine. For example, three measuring points are often used for the measurement of vibrations of a motor, in such a way that the vibrations are measured in three mutually perpendicular directions, i.e. in the X-direction, in the Y-direction and in the Z-direction. The operator must note down each measured value on the formula. It is furthermore necessary for the operator to evaluate the measured values so that he can make a judgement on whether the measured amplitude measurement values indicate a change for a measuring position so that the machine can be serviced if the measured values indicate wear. This places a large demand on the professional knowledge of the service personnel of which vibration and temperature measurement values are acceptable and which measurement values are not acceptable.

In order to identify damage to bearings it is known to use a shock pulse measuring apparatus by means of which damage to bearings can be determined in machines with rotating machine parts. In order to perform such measurements at a measuring point, the diameter of the shaft and the rotational speed of the shaft are set on a measuring scale. These values, which are set by hand, function as a reference level. If the measured values measured by means of the measuring instrument are greater than the reference level, this can be indicated by means of a warning lamp or by means of a sound signal.

It is known from EP-0 194 333 to provide each measuring point with identity data which is automatically readable by means of a separate reading probe. EP-0 194 333 also describes that the characteristic data values for the measuring point are readable at the measuring point so that the above described reference value can be generated automatically. The reference value is consequently calculated in a standardized and unambiguous way from the characteristic data values. Consequently, according to this known technique, the one and the same reference value is valid for all bearings with a certain shaft diameter and a certain rotational speed.

EP-0 211 212 describes a measuring instrument for detecting and evaluating data representative of the condition of a machine. The described measuring instrument has a measuring probe which is combined with a sensor probe for reading a measuring point code, whereby the measuring probe and the code sensing probe are provided in a common mobile casing.

Disclosure of the Invention

The problem which is to be solved by means of the present invention is to provide a method which permits an increased accuracy in detecting changes of the condition of a machine.

This problem is solved according to the invention by means of a method for evaluating the condition of a machine with a measuring point, which method is performed by a movable analysis apparatus comprising the steps of:

producing a condition value, by means of a measurement at the measuring point, which condition value is dependent on the current condition of the machine; and storing the condition value in a writable information carrier (120) which is placed on, or in the vicinity of, the measuring point 90 so that the condition value subsequently can be used as a reference condition value.

According to a preferred embodiment, the reference condition value is produced depending on a measured value, such as a vibration measured value measured in connection with the final inspection of a newly manufactured machine, and on relevant interpreting information, such as shaft diameters and rotational speeds for a rotatable shaft on a machine. With the object of providing a determination of whether some measurable condition change is present, a method according to the invention is performed which comprises the steps of:

a) producing a condition value, which condition value depends upon the actual condition of the machine at the measuring point; and of b) acquiring a reference value, indicating the condition of the machine at the measuring point at an earlier time point, from an information carrier which is placed by, or in the vicinity of, the measuring point.

DESCRIPTION OF THE DRAWONGS

In order to make the present invention easy to understand and produce, it will be described with reference to the appended drawings.

PREFERRED EMBODIMENTS

Figure 1:
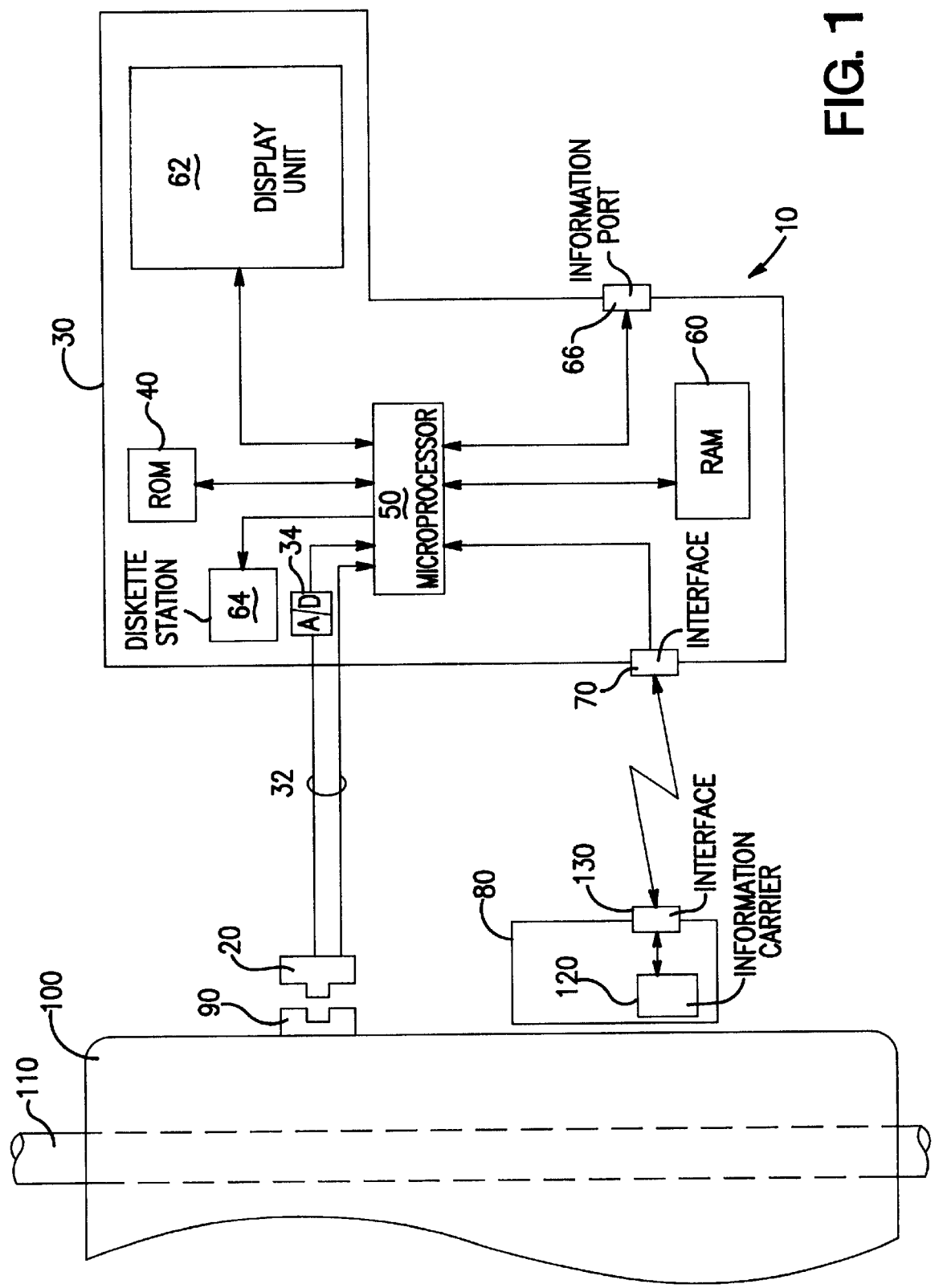
FIG. 1 shows a schematic block diagram of an embodiment of a condition analyzing system according to the invention.

FIG. 1 shows a schematic block diagram of an embodiment of a condition analyzing system 10 according to the invention. The condition analyzing system comprises a sensor unit 20 for producing a measured value dependent on movement and, more precisely, dependent on vibrations.

The sensor unit 20 is connected to an analysis apparatus 30 via a conductor/bus 32. The analysis apparatus 30 comprises a non-volatile memory 40, a microprocessor 50 and a read/write memory 60. A computer program is stored in the read memory 40, and by means of this computer program the function of the analysis apparatus 30 is controlled. When it is written below that the microprocessor 50 performs a certain function, it shall be understood that the microprocessor runs a certain part of the program which is stored in the memory 40.

The microprocessor 50 is connected to a display unit 62. By means of the display unit 62 a user of the condition analyzing system is informed of the condition of the current measuring point in clear text. The production of a condition value is described more closely below. The display arrangement can comprise, on the one hand a screen, on the other hand a printer unit, so that the user can have the condition value from the measuring point printed out if so desired.

According to a preferred embodiment the analysis apparatus 30 comprises a screen 62 on which relevant information is shown during the measuring, and a diskette station 64 in which a diskette is introduceable. In this way the user with the help of the analysis apparatus 30 collects the condition values for a plurality of measuring points and save all the information on a diskette removably introduced into the diskette unit 64. The microprocessor 50 is further connected to an information port 66, by means of which the apparatus 30 can be connected to a separate information processing unit.

The analysis apparatus 30 is equipped with an interface 70 for the exchange of data, with a device 80. When the system is operative, the device 80 is firmly mounted on or at a measuring point 90 on a machine 100 with a movable part 110. A measuring point can comprise a connection coupling firmly attached to the casing of the machine to which the sensor unit is removably attachable. The connection coupling can, for example, be formed of a bayonet coupling. A measuring point can comprise a threaded recess in the casing in which the sensor unit is screwable. In the last case the sensor unit 20 comprises corresponding threads so that it can be introduced into the recess like a screw.

Alternatively, the measuring point is marked on the casing of the machine only with a painted mark.

Figure 2A:
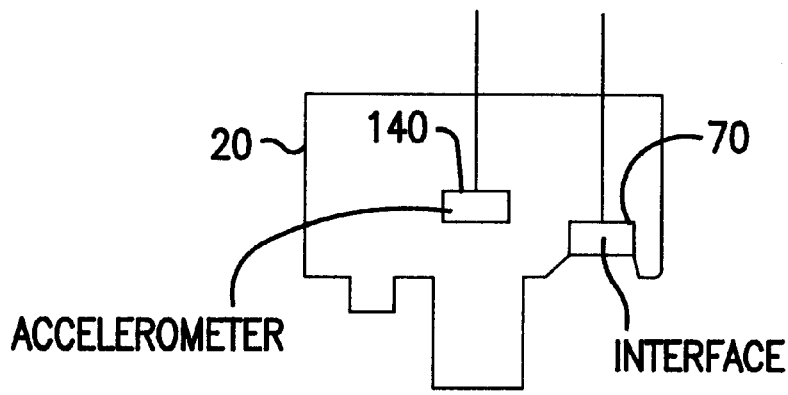
FIG. 2A shows an embodiment of a sensor unit which comprises an interface for communication with an information carrier at a measuring point.
Figure 2B:
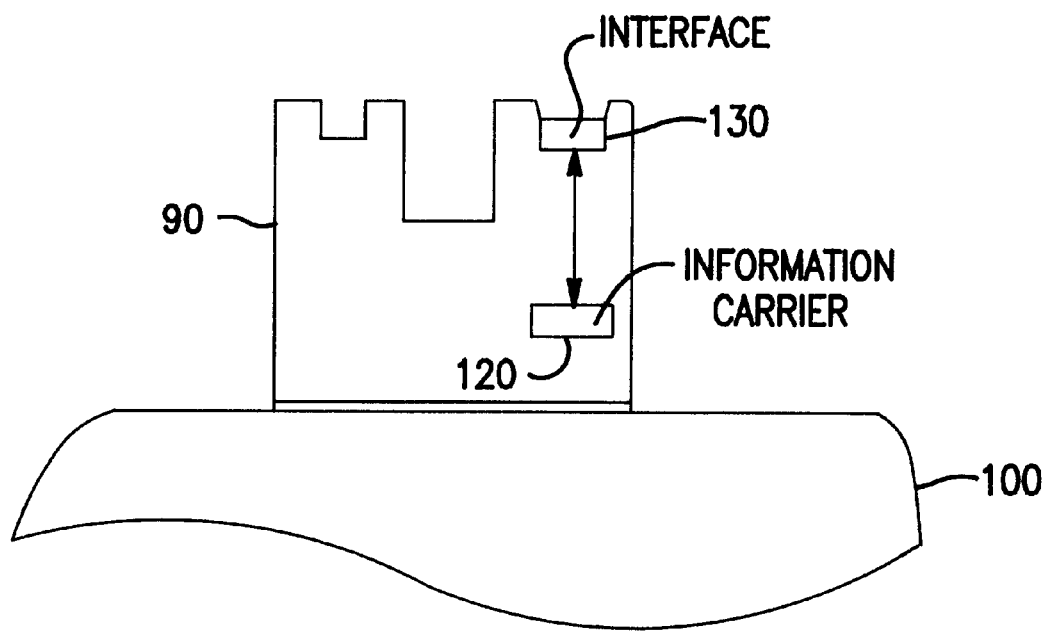
FIG. 2B shows an embodiment of a device at a measuring point comprising an information carrier and an interface for communication with the interface according to FIG. 2A.

As an alternative to the interface means 70 being provided in the analysis apparatus 30 as illustrated in FIG. 1, the interface means (70) and the sensor means (20) may be integrated in a common casing, as illustrated in FIG. 2A.

The machine 100 exemplified in FIG. 1 has a rotating shaft 110 with a certain shaft diameter $d_1$. Shaft 110 in the machine 100 rotates at a certain speed of rotation $V_1$ when the machine is in use.

The apparatus 80 comprises an information carrier 120 which is equipped with information on the identity of the measuring point and interpreting information. The information carrier is furthermore equipped with at least one condition value $K_{ref}$ which can be used as reference for determining a possible change in the condition.

The identity information can be formed of, for example, the identity number of the measuring point or of a data string which identifies both the machine 100 and the measuring point 90. The machine 100, which is only partly shown in FIG. 1, can comprise a number of measuring points and a number of moving parts so that the condition of different parts of the machine can be determined individually. The interpretation data stored in the measuring point device 80 can comprise a first computer word indicating the above mentioned shaft diameter $d_1$ and a second computer word indicating the speed of rotation $V_1$. The information carrier 120 is connected to an interface unit 130 for exchanging information with the interface unit 70 of the analysis apparatus 30. An operator transports the portable analysis apparatus 30 to the measuring point for which the condition value is to be determined and attaches the sensor unit 20 to the measuring point 90. According to one embodiment the sensor unit 20 is provided with a change-over switch (not shown) which closes in dependence of the sensor unit being brought into contact with the measuring point 90. When the change-over switch closes, an activating signal is produced which, via the bus 32 is delivered to the microprocessor 50 and thereby activates the microprocessor to perform an analysis routine. An actual condition value is determined by the analysis routine, and a reference value $K_{ref}$ acquired from the information carrier 120. The reference value $K_{ref}$ indicates the condition value for the individual machine for the same measuring point at an earlier point of time. The reference value $K_{ref}$ is stored in the information carrier in the same way as described below.

When the machine is new from the factory or when a bearing for a rotatable shaft 110 is renovated or exchanged, a condition value $K_{ref}$ for each measuring point 90 of the machine 100 is determined.

The condition reference value for the measuring point is determined according to a preferred embodiment by producing a measured value indicating the vibration or temperature of the machine at the measuring point and, in a known way, with the help of interpretation information, such as shaft diameter and speed of rotation of the shaft, transforming the measured value into a condition value. Because this condition value $K_{ref}$ is produced when the corresponding machine part is new or newly renovated, possible later condition changes can be advantageously determined by comparison with the reference $K_{ref}$.

When the apparatus 30 is used to produce the reference condition value $K_{ref}$, a keyboard is connected to the information port 66 and the microprocessor is instructed to perform a reference-producing routine. The reference-producing routine involves the microcomputer 30 acquiring a measuring value from the sensor unit 20 and the display unit 62 showing a request for the operator to input the interpretation information which applies for the measuring point.

The interpretation information can be inputted, for example, via the keyboard or by means of a diskette which is introduced into the diskette station 64.

The microcomputer calculates the actual condition value $K_{ref}$ indicating the condition of the individual measuring point depending on the measured value and the inputted interpretation information.

Both the condition reference value $K_{ref}$ and the inputted interpretation information determined in this way are delivered to the information carrier 120 via the interface 70.

Alternatively, the interpretation data as well as the reference value $K_{ref}$ can be delivered to the diskette unit 64 or the display unit screen 62 in order to be inputted to the information carrier 120 in another way.

According to a preferred embodiment of the invention the device 80 comprises a readable and writable memory 120 which can exchange information in both directions with the interface 130. According to one embodiment the device 80 comprises a photoelectric cell which provides the power supply to the memory 120 and the interface 130.

Because the device 80 in the above described way is applied with a condition reference value which is individual for the machine and for the measuring point, later condition measuring can give advantageously accurate indications about changes in the condition. This means that the analysis apparatus does not have to be provided with any information at all about the machine or its measuring point, and despite this it is still possible to achieve an accurate evaluation of whether any changes in the condition have occurred. This is of considerable advantage, for example, during the checking of the condition of machines fixed to the floor in a large manufacturing industry, where the number of machines and measuring points is very large. It further provides a very good security as the risk of mixing of the data in a data base is eliminated by the reference condition value being stored directly at the measuring point.

A method for determining a possible change in the condition is usually performed with a certain regularity by maintenance personnel. A first example of when such a process can be performed, according to the invention, is when a machine has just been installed after delivery. In this situation there is already a condition reference value in the information carrier which has been generated and stored there in connection with the final inspection at the manufacturer of the machine.

When the installator has just installed the machine, the process is performed for determining a possible change in the condition with the purpose of verifying that the installation is correct and that the condition of the machine has not deteriorated during the transport from the manufacturer.

The method comprises the steps of:
producing a measured value which depends on a movement of the machine;
acquiring interpretation information from an information carrier which is mounted by the measuring point;
producing an actual condition value, indicating the actual condition of the measuring point on the machine, dependent on the measured value and the interpretation;
acquiring a second condition value, indicating the condition of the measuring point at an earlier point of time, from the information carrier;
producing a relation value dependent on the actual condition value and the second condition value, which relation value indicates a change in the condition.

This process can be performed by the microprocessor 50 by it running an analysis routine which is stored in the memory 40.

The analysis routine comprises the step of the microprocessor 50 requesting measured values from the sensor unit 20. According to one embodiment of the invention the sensor unit comprises an accelerometer 140 with a piezoelectric element. When the measuring point 90 vibrates, the sensor unit 20, or at least a part of it, also vibrates and the accelerometer 140 then produces an electrical signal of which the frequency and amplitude depend on the mechanical vibration frequency and the vibration amplitude of the measuring point 90, respectively. The electrical signal is delivered to the analog-digital converter 34 which with a certain sampling frequency $f_s$ converts the analog signal to consecutive digital words in a known way. The microcomputer 50 stores a series of digital words which correspond to a time sequence of the electrical signal in the memory 60, and then performs an analysis of the signal sequence, whereby the frequency and amplitude of the signal is determined. Consequently, a measured value for the vibration amplitude $A_v$ and the vibration frequency $f_v$ is determined. The microcomputer then takes the interpretation information and the reference value $K_{ref}$ from the device 80 by reading information from the interface 70.

The communication between the interfaces 70 and 130 may be performed by means of radio communication or by means of optical transmitters and optical receivers. According to one embodiment, the interface 130 on the device 80 comprises an opto-transmitter which transfers data serially to the interface 70 in the form of trains of pulses of infrared light. Alternatively, communication between the information carrier 120 and the analysis apparatus 30 may be by way of ohmic contact between the interfaces 130 and 70.

The device 80 can be activated depending on an information request which is received via the interface 130. Alternatively, the device 80 comprises a detector element which senses if the sensor unit 20 is applied to the measuring point 90 and then activates the device 80 to send information to the interface 130.

In this way the microcomputer receives information on the identity of the measuring point and interpretation information, such as the diameter value $d_1$ and the rotational speed value $V_1$.

With knowledge of the interpretation information $d_1$ resp. $V_1$, each measured vibration amplitude value $A_v$ can be easily converted to an actual condition value $K_a$. A predetermined interpretation algorithm is stored in the memory 40 and starting from an amplitude value $A_v$ and interpretation information, such as $d_1$ and $V_1$, the microcomputer produces a corresponding condition value $K_a$ dependent thereon. Such an interpretation algorithm is based on an embodiment of a method for producing a condition value described in the Swedish Laid-Open Document 339 576.

According to one embodiment, the interpretation algorithm is based on the machine classification standard ISO 2954.

The actual condition value $K_a$ produced an d the reference condition value $K_{ref}$ acquired from the in formation carrier 120 are delivered to the screen 62 so that the operator can judge if the two values correspond. If $K_a$ is essentially similar to $K_{ref}$ the condition is essentially unchanged. If there is a discrepancy between the two values, then this indicates that the condition of the machine has changed.

Because the actual condition value $K_a$ according to the invention can be compared with an earlier measured condition value $K_{ref}$ for the same measuring point, an extremely accurate indication of changes is achieved. In this way, advantageously well-judged decisions can be made on when maintenance is required, which in turn leads to that the life length of the machine can be increased.

According to a preferred embodiment, the microcomputer produces a relation value in dependence of the actual condition value $K_a$ and the reference condition value $K_{ref}$.

Condition values may be produced by producing a measured value by means of measuring at the measuring point, acquiring interpretation information ($d_1$, $V_1$) from the information carrier 120, and generating the actual condition value based on the measured value ($A_v$) and the interpretation information. Alternatively, the condition value may be produced directly by means of measuring at the measuring point, so that the condition value is based on the measured value without consideration of interpretation information.

By dividing the value $K_a$ with the reference $K_{ref}$, a relation value is achieved which gives a percentage change of the condition of the machine part or parts to which the measuring points relate. According to another embodiment the relation value is produced as the difference between the value $K_a$ and the reference $K_{ref}$.

What is claimed is:

1. A system for analyzing a condition of a machine having moving parts, said system comprising:
a measuring point attached to the machine, the measuring point comprising a connection coupling, an information carrier, and a measuring point communication interface; and
an analysis apparatus comprising:
a microprocessor;
a non-volatile memory;
a sensor unit constructed and arranged to connect to the connection coupling so that vibrations of the machine are transmitted to the sensor unit; and
an analysis apparatus communication interface constructed and arranged to allow bi-directional communication with the measuring point communication interface;
wherein the non-volatile memory stores instructions adapted to be executed by the microprocessor to perform the steps of:
calculating a condition value based on interpretation data related to the machine and measured vibration values; and
storing the calculated condition value in the information carrier of the measuring point as a reference value.

2. The system of claim 1, wherein the measuring point comprises first and second physically separate components individually attached to the machine, the first component comprising the connection coupling, the second component comprising the information carrier and the measuring point communication interface.

3. The system of claim 1, wherein the non-volatile memory additionally stores instructions adapted to be executed by the microprocessor to perform the steps of:
requesting measured vibration values from the sensor unit;
acquiring interpretation information and a condition reference value from the information carrier;
calculating a condition current value based on the measured vibration values and the interpretation information; and
producing a relation value based on the condition reference value and the condition current value.

4. The system of claim 3, wherein the measuring point comprises first and second physically separate components individually attached to the machine, the first component comprising the connection coupling, the second component comprising the information carrier and the measuring point communication interface.

5. The system of claim 3, wherein the relation value represents a division of the condition current value by the condition reference value.

6. The system of claim 3, wherein relation value represents a difference between the condition current value and the condition reference value.

7. A system for analyzing a condition of a machine having moving parts, said system comprising:
a measuring point attached to the machine, the measuring point comprising a connection coupling, an information carrier, and a measuring point communication interface; and
an analysis apparatus comprising:
a microprocessor;
a non-volatile memory;
a sensor unit constructed and arranged to connect to the connection coupling so that vibrations of the machine are transmitted to the sensor unit; and
an analysis apparatus communication interface constructed and arranged to allow bi-directional communication with the measuring point communication interface;
wherein the non-volatile memory stores instructions adapted to be executed by the microprocessor to perform the steps of:
requesting current measured vibration values from the sensor unit;
acquiring the interpretation information and the condition reference value from the information carrier;
calculating a condition current value based on the current measured vibration values and the interpretation information; and
producing a relation value based on the condition reference value and the condition current value.

8. The system of claim 7, wherein the condition reference value represents a condition of the machine at an earlier point in time.

9. The system of claim 7, wherein the measuring point comprises first and second physically separate components individually attached to the machine, the first component comprising the connection coupling, the second component comprising the information carrier and the measuring point communication interface.

10. The system of claim 7, wherein the relation value represents a division of the condition current value by the condition reference value.

11. The system of claim 7, wherein relation value represents a difference between the condition current value and the condition reference value.

12. A system for analyzing a condition of a machine having moving parts, said system comprising:
a measuring point attached to the machine, the measuring point comprising a connection coupling, an information carrier, and a measuring point communication interface;
means for analyzing the machine by measuring vibration of the machine through the connection coupling, reading information related to the machine from the information carrier through the measuring point communication interface, and determining a current state of the machine;
wherein the measuring point comprises first and second physically separate components individually attached to the machine, the first component comprising the connection coupling, the second component comprising the information carrier and the measuring point communication interface.

13. The system of 12, wherein the information carrier contains information related to a measurement taken at the connection coupling of the first component.

14. A system for analyzing a condition of a machine having moving parts, comprising:
a measuring point attached to the machine, the measuring point comprising a connection coupling, an information carrier, and a measuring point communication interface;
a sensor unit comprising a vibration transducer, the sensor unit being structured to physically engage the connection coupling of the measuring point so that vibrations of the machine at the measuring point are transferred to the vibration transducer;
an analysis apparatus comprising an analog-to-digital converter electrically connected to receive an output of the transducer, a microprocessor electrically connected to receive an output of the analog-to-digital converter, and an analysis apparatus communication interface connected to the microprocessor;

wherein the system is arranged to allow bidirectional communication between the measuring point communication interface and the analysis apparatus communication interface, and wherein the measuring point communication interface and the analysis apparatus communication interface are constructed to allow the communication without ohmic contact therebetween.

15. The system of claim 14, wherein the measuring point communication interface and the analysis apparatus communication interface are constructed to communicate with one another by radio transmissions.

16. The system of claim 14, wherein the measuring point communication interface and the analysis apparatus communication interface are constructed to communicate with one another by optical transmissions.

17. The system of claim 16, wherein the optical transmissions comprise pulses of infrared light.

18. The system of claim 14, wherein the system is constructed to allow the bidirectional communication between the measuring point communication interface and the analysis apparatus communication interface while the sensor unit is physically engaged with the connection coupling of the measuring point.

19. A method for analyzing a condition of a machine having moving parts, the machine having a measuring point comprising a connection coupling, an information carrier, and a measuring point communication interface, the method comprising the steps of:

connecting an analysis apparatus having a sensor unit comprising a vibration transducer to the measuring point so that vibrations of the machine at the measuring point are transferred to the vibration transducer;

converting an output of the transducer to digital data;

analyzing the digital data to produce a first condition value; and communicating the first condition value through an analysis apparatus communication interface and the measuring point communication interface to the information carrier;

wherein the communication between the measuring point communication interface and the analysis apparatus communication interface is performed without ohmic contact therebetween.

20. The method of claim 19, further comprising the steps of:

after communicating the first condition value to the information carrier, repeating the connecting, converting, and analyzing steps to produce a second condition value;

communicating the first condition value from the information carrier to the analysis apparatus through the measuring point communication interface and the analysis apparatus communication interface; and comparing the first and second condition values.

21. A system for analyzing a condition of a machine having moving parts, said system comprising:

a measuring point attached to the machine, the measuring point comprising a connection coupling, an information carrier, and a measuring point communication interface; and an analysis apparatus comprising:
a microprocessor;
a non-volatile memory;
a sensor unit constructed and arranged to connect to the connection coupling so that vibrations of the machine are transmitted to the sensor unit; and
an analysis apparatus communication interface constructed and arranged to allow bi-directional communication with the measuring point communication interface without ohmic contact;

wherein the non-volatile memory stores instructions adapted to be executed by the microprocessor to perform the steps of:
calculating a condition value based on measured vibration values; and
storing the calculated condition value in the information carrier of the measuring point as a reference value.

22. The system of claim 21, wherein the measuring point comprises first and second physically separate components individually attached to the machine, the first component comprising the connection coupling, the second component comprising the information carrier and the measuring point communication interface.

23. The system of claim 21, wherein the non-volatile memory additionally stores instructions adapted to be executed by the microprocessor to perform the steps of:
requesting measured vibration values from the sensor unit;
acquiring a condition reference value from the information carrier;
calculating a condition current value based on the measured vibration values; and
producing a relation value based on the condition reference value and the condition current value.

24. The system of claim 23, wherein the measuring point comprises first and second physically separate components individually attached to the machine, the first component comprising the connection coupling, the second component comprising the information carrier and the measuring point communication interface.

25. The system of claim 23, wherein the relation value represents a division of the condition current value by the condition reference value.

26. The system of claim 23, wherein relation value represents a difference between the condition current value and the condition reference value.

27. A system for analyzing a condition of a machine having moving parts, said system comprising:

a measuring point attached to the machine, the measuring point comprising a connection coupling, an information carrier, and a measuring point communication interface; and an analysis apparatus comprising:
a microprocessor;
a non-volatile memory;
a sensor unit constructed and arranged to connect to the connection coupling so that vibrations of the machine are transmitted to the sensor unit; and
an analysis apparatus communication interface constructed and arranged to allow bi-directional communication with the measuring point communication interface without ohmic contact;

wherein the non-volatile memory stores instructions adapted to be executed by the microprocessor to perform the steps of:
requesting current measured vibration values from the sensor unit;

acquiring the condition reference value from the information carrier;

calculating a condition current value based on the current measured vibration values; and producing a relation value based on the condition reference value and the condition current value.

28. The system of claim 27, wherein the condition reference value represents a condition of the machine at an earlier point in time.

29. The system of claim 27, wherein the measuring point comprises first and second physically separate components individually attached to the machine, the first component comprising the connection coupling, the second component comprising the information carrier and the measuring point communication interface.

30. The system of claim 27, wherein the relation value represents a division of the condition current value by the condition reference value.

31. The system of claim 27, wherein relation value represents a difference between the condition current value and the condition reference value.

* * * * *

UNITED STATES PATENT AND TRADEMARK OFFICE
CERTIFICATE OF CORRECTION

PATENT NO. : 6,499,349 B1  Page 1 of 1
DATED : December 31, 2002
INVENTOR(S) : Aronsson It is certified that error appears in the above-identified patent and that said Letters Patent is hereby corrected as shown below:

<u>Title page,</u>
Item [75], Inventor, "Carsten Aronsson, Strangnas (SE)" should be
-- Carsten Aronson, Strangnas (SE)
   Jarl-Ove Lindberg, Strangnas (SE) --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,499,349 B1 | Page 1 of 1 |
| APPLICATION NO. | : 09/214291 | |
| DATED | : December 31, 2002 | |
| INVENTOR(S) | : Carsten Aronsson | |

It is certified that error appears in the above-identified patent and that said Letters Patent is hereby corrected as shown below:

On the Title Page

Item (73) Assignee:

"SPM Instrument AB" should read --S.P.M. Instrument AB--

Signed and Sealed this

Fifth Day of May, 2009

JOHN DOLL
*Acting Director of the United States Patent and Trademark Office*